FIG. 1

INVENTOR,
H. J. Van Doorne
BY Wenderoth, Lind
And Ponack, attorneys

FIG. 3

July 18, 1967 H. J. VAN DOORNE 3,331,464
FOUR WHEEL BELT VARIABLE TRANSMISSION DRIVE
Filed Jan. 8, 1965 9 Sheets-Sheet 4

FIG. 4

H. J. Van Doorne,
INVENTOR.

BY Wenderoth, Lind
and Ponack,
Attorneys

FIG. 8

United States Patent Office 3,331,464
Patented July 18, 1967

3,331,464
FOUR WHEEL BELT VARIABLE
TRANSMISSION DRIVE
Herbertus J. van Doorne, Deurne, Noord-Brabant, Netherlands, assignor to Van Doorne's Automobielfabriek N.V., Eindhoven, Netherlands
Filed Jan. 8, 1965, Ser. No. 424,394
2 Claims. (Cl. 180—44)

The invention relates to a vehicle with at least four driven wheels.

The object of the invention is to provide a four wheel driven vehicle of this type, developed to provide high cross-country mobility with an unparalleled ease of control.

A further object of the invention is to provide a light vehicle adapted to be easily driven on uneven ground.

Still a further object of the invention is to provide a four wheel driven vehicle the construction of which permits a large ground clearance.

Still a further object of the invention is to provide a four wheel driven vehicle in which the necessity of manual gear changing is eliminated.

Still a further object of the invention is to provide a four wheel driven light vehicle in which the up and down movements of the axles are possible without using universal joints in the connection between the sprung and the non-sprung parts.

Still a further object of the invention is to provide a four wheel driven vehicle which is controlled by an accelerator and which adapts itself automatically to the driving conditions.

Still a further object of the invention is to allow the driver to control the vehicle while walking or crawling behind it, without having to change gear or to operate the clutch.

With the above and other objects in view reference is made to the drawings in which three embodiments of a vehicle are shown, the four wheels of which are driven through an automatically variable belt transmission system. In these drawings.

With reference to FIGURES 1-4 the vehicle comprises a frame 1 supporting a floor 2 the greater part of which is broken away.

The floor 2 carries a bucket seat 3 for the driver, in front of which an auxiliary frame 4 is fixed to the main frame 1 by means of a strut 5. The auxiliary frame 4 supports a brake pedal 6 and an accelerator 7 which serves as controls for driving the vehicle. The connection between the brake pedal 6 and the wheel brakes, and the connection between the accelerator 7 and a throttle valve or the like of the engine are not shown in the drawings as they may be of any known kind and do not constitute a part of the invention.

A steering gear casing 8 is fixed to the front of the vehicle and carries a steering column 9 having a steering wheel 10 at its upper end. From the steering gear casing 8 the motion of the steering wheel 10 is transmitted by means of a steering shaft 11 to a steering worm casing 12 and from there by an angle lever 13 and connecting rods 14, 14 to the normal steering knuckle arms 15, 15 in order to steer the front wheels 16, 16.

The steering shaft 11 projects beyond the steering worm casing 12 and is connected by universal joints 17 and 18 and a shaft 19 to an auxiliary steering shaft 20. The rear end of the auxiliary steering shaft is carried by a bracket 21 and is formed with a splined portion 22. The steering wheel 10 forms a unit with a sleeve 23 and is detachable from the steering column 9. If the steering wheel 10 together with its sleeve 23 is removed from the steering column 9, it may be fitted to the spline portion 22 of the auxiliary steering shaft 20 as shown by dotted lines 10a and 23a. The purpose of this is to enable the vehicle to be driven by a person walking or crawling behind the vehicle. In this case the driver further disposes of a combined throttle and brake lever 24 connected by Bowden cables 25 and 26 in a way not shown in the drawings, to the throttle valve and the brakes mentioned above. The system 24, 25, 26 is adapted to be swung under the vehicle floor. The driver walking or crawling behind the vehicle is able to steer the vehicle with one hand by means of the steering wheel 10a and to operate the throttle valve and the brakes by means of the combined lever 24 with the other hand.

From the angle lever 13 a connecting rod 27 extends to the front and is connected to a forked lever 28 which is swivable about a vertical pivot 29. If the vehicle is to be towed by another vehicle, a draw bar (not shown) may be fitted to the forked lever 28 in order to steer the vehicle thereby. A removable pin 30 is arranged at the rear end of the vehicle to which a draw bar may be connected. In this way a number of vehicles may be composed to a steerable train.

A front cross spring 31 and a rear cross spring 32 support the vehicle on its front and rear axles 33 and 34, respectively.

As will be clear from the drawings an engine 35 which is diagrammatically shown only by its circumference is supported substantially in the center cross plane. The engine may be of any type. The casing of the engine 35 forms a unit with a casing 36 housing an automatic centrifugal clutch (not shown) and from there extends a driving shaft 37 to a casing 38 comprising gears which in the usual way change the direction of the drive under right angles to a shaft of a primary pulley which is in general indicated by 39.

The pulley 39 is of an axially expandable and contractable type, e.g., as shown in Patent No. 3,017,783, granted Jan. 23, 1962, to Joan van der Brugghen et al. This pulley comprises a fixed pulley half 40 and a pulley half 41 which is slidable on its shaft 42. A drum 43 fixed to said slidable pulley half comprises the elements for automatically varying the distance between the pulley halves 40 and 41 by vacuum and centrifugal action, for instance of a construction as shown and described in the above-mentioned patent.

The primary pulley 39 is connected by a V-belt 44 to a secondary pulley which is generally indicated by 45. This secondary pulley is also of an axially expandable type as shown and described in Patent No. 3,060,759, granted Oct. 30, 1962, to Joan van der Brugghen, and comprises a fixed pulley half 46 and a slidable pulley half 47.

The elements comprised in the drum 43 may be spring means, centrifugal means and vacuum means in order to adapt the mutual distance between the pulley halves 40 and 41 to the engine speed and to the driving resistance, such as described in the above patents. This automatic transmission system makes it possible to drive and control the vehicle under all conditions by means of the accelerator 7 and the brake pedal 6 or a hand brake lever 6a or, if desired, by means of the combined throttle and brake lever 24, and under certain circumstances by using a hand control if it is required to use the engine as a brake.

The secondary pulley 45 drives a shaft 48 (FIG. 2) which is rotatably supported in a tubular housing 49 fixedly connected to a gear casing 50 forming a unit with rear axle 34. The gear casing 50 comprises a reduction gear 51 in order to transmit the drive at a lower rotating speed through a set of bevel gears 52 to the rear wheels 53. A shaft 54 is adapted to be coupled to said reduction gear 51 by means of a dog clutch 55 in the usual way to gears for two different speeds.

Figure 1:
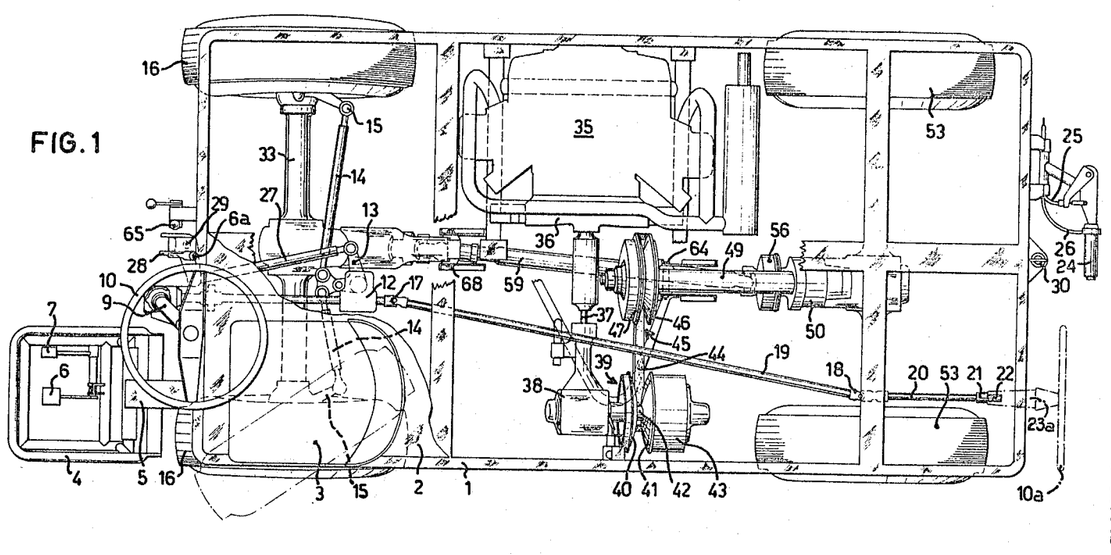
FIGURE 1 is a plan view of the first embodiment, the greater part of the floor being broken away in order to show the several parts beneath it.
Figure 2:
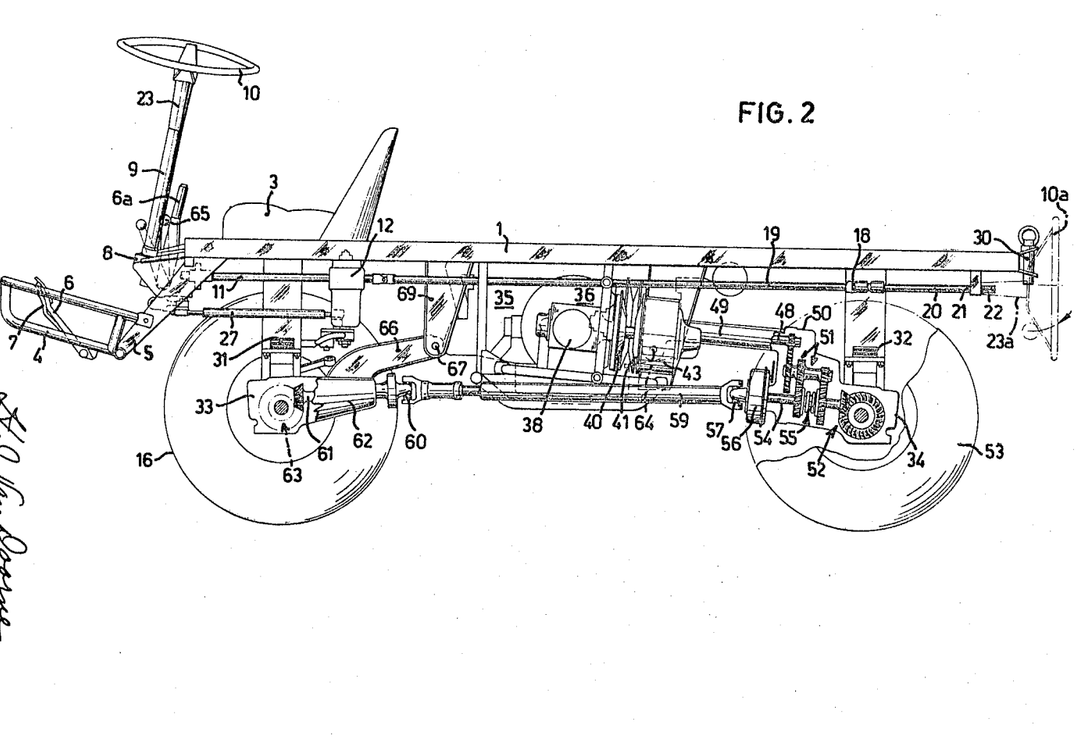
FIGURE 2 is a side view of the vehicle shown in FIG. 1, one wheel and a portion of the frame being broken away.
Figure 3:
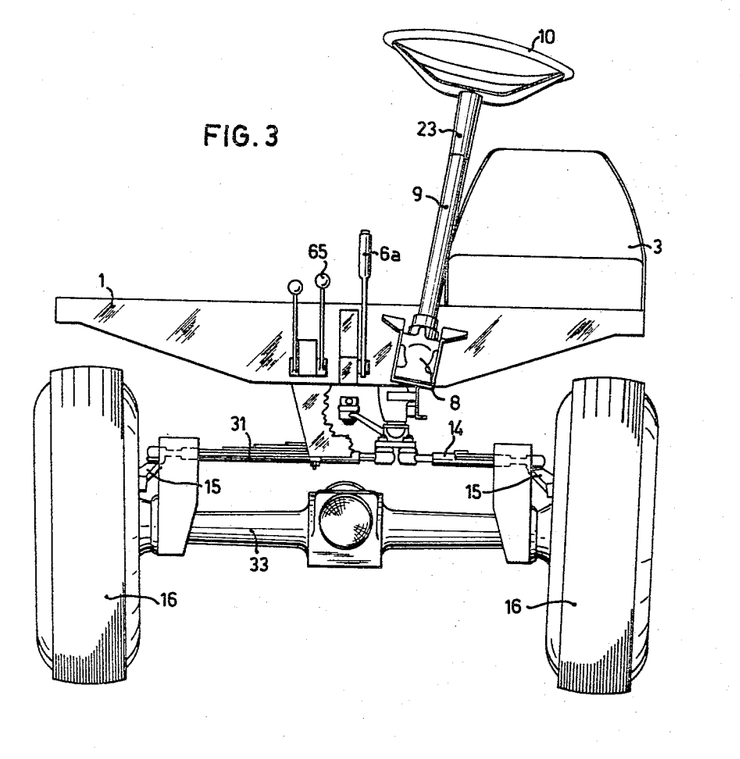
FIGURE 3 is a front view of the vehicle shown in FIGS. 1 and 2.
Figure 4:
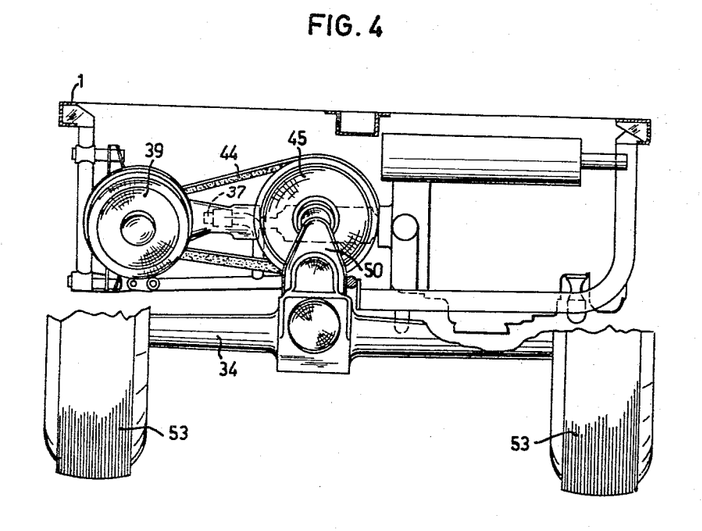
FIGURE 4 is a rear view of the vehicle shown in FIGURES 1 and 2.

The shaft 54 carries a drum 56 comprising brake means in the known way and is provided with a universal joint 57 in order to drive the front wheels 16 through a telescopic shaft 59 and a universal joint 60 carried by a shaft 61. The shaft 61 is located in a tubular member 62 forming a unit with the front axle 33 and comprising a set of bevel gears 63.

The rear axle 34, which by means of the gear casing 50 and the tubular housing 49 forms a rigid unit, will, when the vehicle is driven over uneven ground and thus the rear wheels 53 go up and down, swivel about an axis of a pivot 64 supported by the vehicle frame 1.

The dog clutch 55 enables the driver by means of a handle 65 to engage the normal or the low gear if the vehicle meets a very strong resistance, e.g. on steep hills or when stuck in sand or mud. As will be seen from the drawings, the distance between the axis of the pivot 64 and the secondary pulley 45 is very small, with the result that the up and down swivelling movements of the unit 34, 50, 49 causes only a very slight displacement or wobbling movement of the pulley 45. Consequently the belt 44 is only slightly twisted and this twisting deformation is easily permitted by the flexibility of the belt.

An important feature of the above described arrangement is that the belt 44 not only functions as a driving means, but also as a flexible coupling between the vehicle frame 1 and the swivelling rear axle 34. Consequently there is a uniform transmission of the rotation.

An arm 66 is rigidly connected to the front axle 33 and permits a swivelling movement about the axis 67 of a pivot 68 supported by members 69 which are fixed to the vehicle frame.

Figure 5:
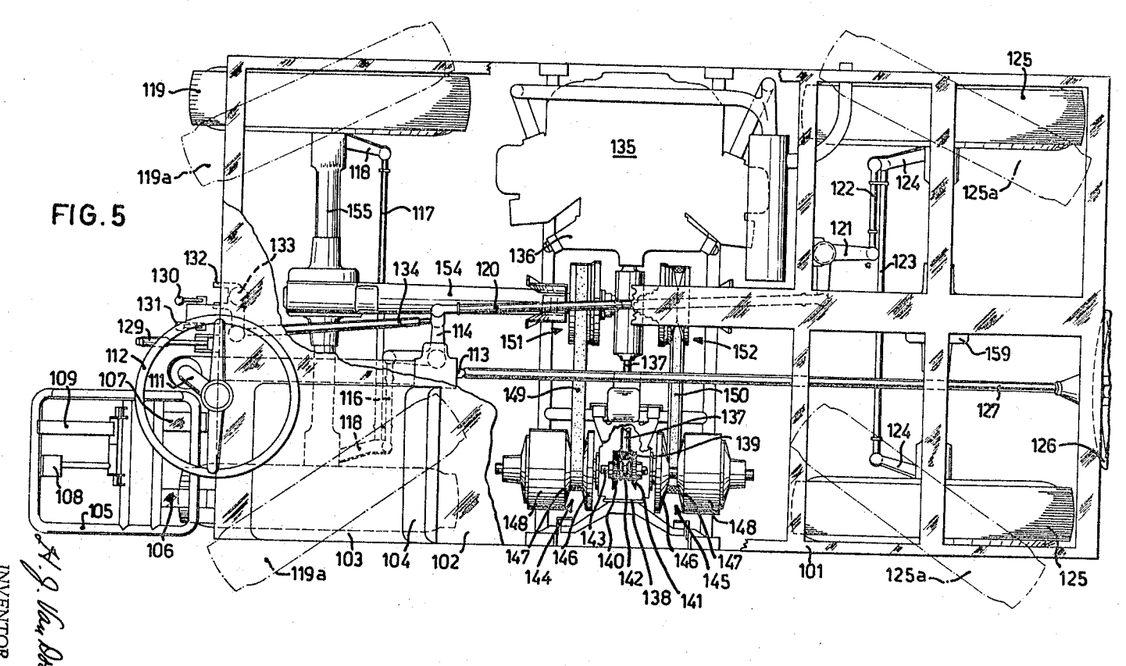
FIGURE 5 is a top view of a second embodiment, the greater part of the floor being broken away in order to show the several parts beneath it.
Figure 6:
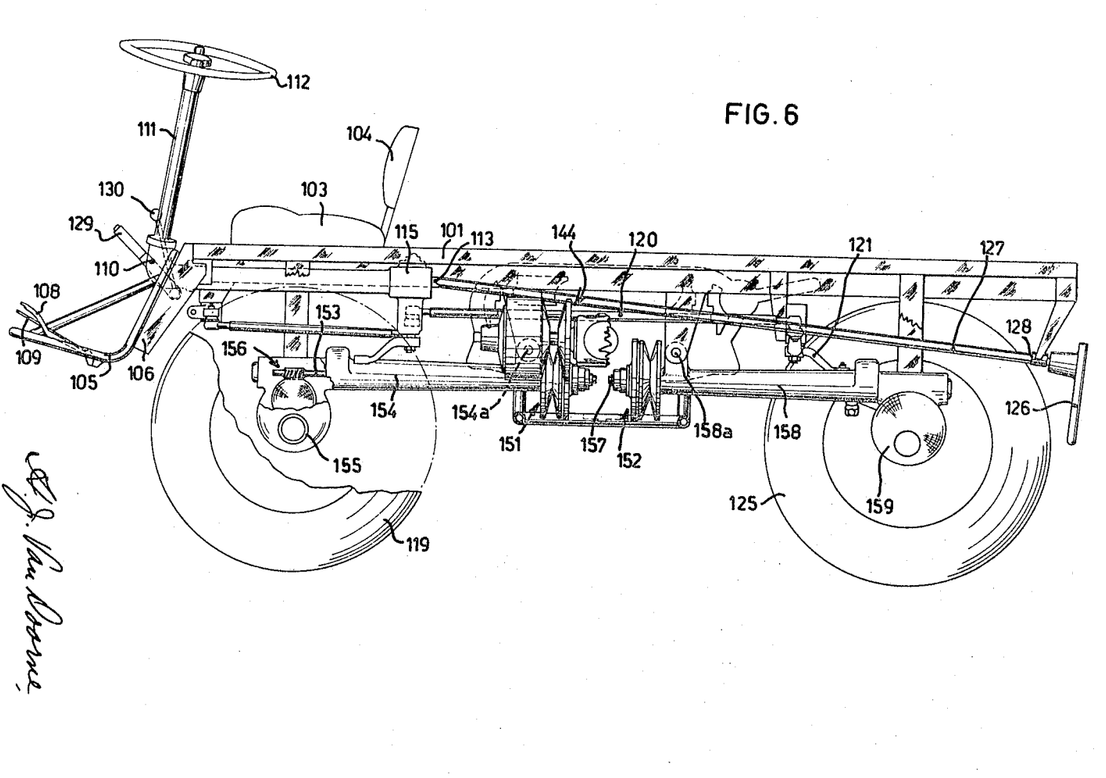
FIGURE 6 is a side view of the vehicle shown in FIGURE 5, a portion of the wheels being broken away in order to show the parts behind them.
Figure 7:
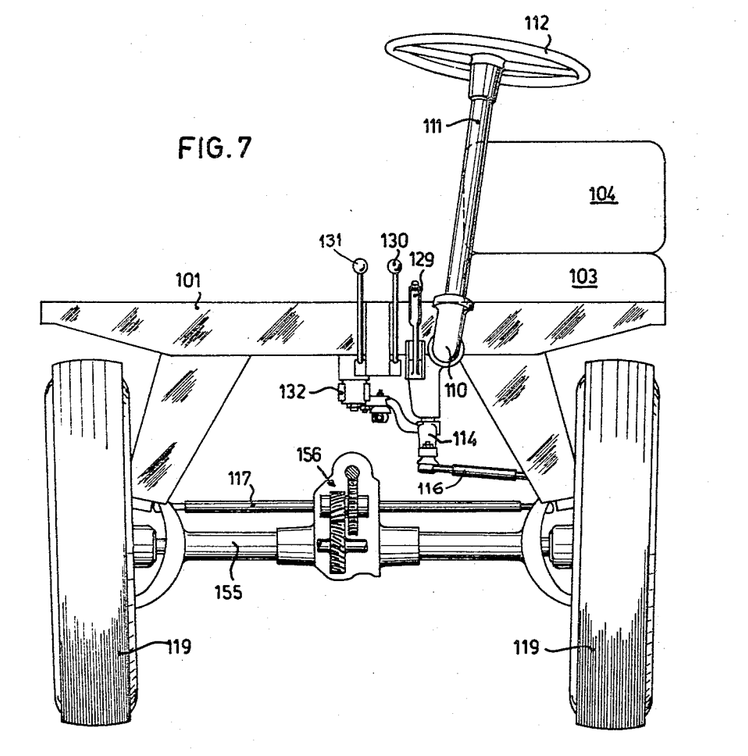
FIGURE 7 is a front view of the vehicle shown in FIGURE 5.

The embodiment shown in FIGS. 5, 6 and 7 is based on the same principle as the embodiment shown in FIGS. 1–4 since the engine is also supported substantially in the center cross plane of the vehicle and drives the front and rear wheels by means of an automatically variable belt transmission system.

With reference to FIGS. 5–7 the vehicle comprises a frame 101 supporting a floor 102 the greater part of which is broken away. The floor carries a seat 103 having a back 104 from the driver and in front of the seat an auxiliary frame 105 is connected to the main frame 101 by means of struts 106, 107. The auxiliary frame 105 supports a brake pedal 108 and an accelerator 109 which serve as controls for driving the vehicle. The connection between the brake pedal 108 and the wheel brakes, and the connection between the accelerator 109 and a throttle valve or the like of the engine are not shown in the drawings as they may be of any kind and do not constitute a part of the invention.

A steering gear casing 110 carrying a steering column 111 and a steering wheel 112 is fixed to the main frame 101. From the steering gear casing 110 the motion of the steering wheel 112 is transmitted by means of a steering shaft 113 to a crank lever 114 pivotally carried by a steering worm casing 115. The swivelling movement of said crank lever 114 is transmitted by a link 116 and a connecting rod 117 to the steering knuckle arms 118, 118 in order to steer the front wheels 119.

The crank lever 114 is connected, by means of a rod 120, to a second crank lever 121. The swivelling movement of the crank lever 114 is thus transmitted to the second crank lever 121 and from there by a link 122 and a connecting rod 123 to the rear wheel knuckle arms 124, 124 in order to steer the rear wheels 125, 125. In FIG. 5 of the drawings the extreme positions of the front wheels and the rear wheels when steering through a left hand turn are indicated by dot and dash lines 119a and 125a, respectively.

In the same way as in the first embodiment the vehicle may be steered by means of a second steering wheel 126 at the rear end of a shaft 127 which is connected to the steering shaft 113. The shaft 127 is supported near its rear end by a bearing 128 carried by the frame 101. The steering wheel 126 may be a second steering wheel as mentioned above, but if desired the steering wheel 112 may be detachably placed on the steering column 111 in order to be removed and fitted on the rear end of the shaft 127.

A hand brake lever 129 is arranged near the driver's seat 103 and further two handles 130 and 131, the purpose of which will be described later on, are also placed at the front end of the vehicle. Further the front end of the frame carries a forked lever 132 pivoted at 133 and connected by a rod 134 to the crank lever 114. The purpose of the lever 132 is to receive a tow bar if the vehicle has to be trailed by another vehicle. The swivelling movement of the forked lever 132 imparted by the tow bar, will be transmitted by the rod 134 to the crank lever 114 and thus to the front wheels 119, and by the connecting rod 120 to the second crank lever 121 and thus to the rear wheels 125.

An engine, preferably of a type having a limited height, is represented only by its circumference and is generally indicated by 135. The casing of the engine 135 forms a unit with a casing 136 which houses an automatic centrifugal clutch (not shown). A driving shaft 137 extends in lateral direction to a primary gear casing 138. A bevel gear 139 at the end of the shaft 137 engages two bevel gears 140 and 141, so that if said bevel gear 139 is driven by the engine 135, said gears 140 and 141 will rotate in opposite directions. A dog clutch 142 which is shiftable by said handle 130 through a linkage (not shown in the drawings) is slidably but non-rotatably arranged on a primary shaft 143. The position of said dog clutch 142 determines the sense of rotation of said primary shaft 143, which is parallel to the longitudinal direction of the vehicle.

The said shaft 143 carries, at both sides of the casing 138, primary pulleys which are generally indicated by 144 and 145, respectively. These pulleys are of an axially expandable and contractable type, as shown in the above-mentioned Patent No. 3,017,783 and each of them comprises a fixed pulley half 146 on the shaft 143 and a pulley half 147 which is slidable along said shaft. Drums 148 comprising spring means, centrifugal means and vacuum means, are fixed to said slidable pulley halves 147, 147. V-type belts 149 and 150 connect said primary pulleys 144 and 145 to secondary pulleys 151 and 152, respectively. These are also of an axially expandable type, as shown and described in Patent No. 3,060,759, mentioned above.

The elements comprised in the drums 148, 148 serve to adapt the mutual distance between the pulley halves 146 and 147 of each primary pulley to the engine speed and to the driving resistance, such as described in the above-mentioned Patent Nos. 3,017,783 and 3,017,785. This automatic transmission system makes it possible to drive the vehicle under all conditions by means of the accelerator 109 and under certain circumstances by using a hand control described in the last-mentioned patent if it is required to use the engine as a brake.

The secondary pulley 151 drives a shaft 153 enclosed in a tubular housing 154 which forms a unit with a front axle 155. The drive on the shaft 153 is transmitted through a reduction gear 156 housed in the front axle 155, to the front wheels 119.

In the same way the secondary pulley 152 drives a shaft 157 enclosed in a tubular housing 158 forming a unit with the rear axle 159. This rear axle comprises also a reduction gear (not shown) by means of which the drive from the shaft 157 is transmitted to the rear wheels 125.

The tubular housing 154 and the tubular housing 158 are adapted to swing about horizontal pivots 154a and 158a, respectively. These pivots are resiliently carried by the vehicle frame in lateral direction so that the front axle 155 and the rear axle 159 can go up and down and can swivel laterally in order to permit the wheels to follow unevennesses of the ground.

In the above way a four wheel drive is achieved in an effective way having all the advantages of the simple control of an automatically variable belt transmission system. The belts 149 and 150 function not only as a driving means, but also as a flexible coupling between the fixed parts and the swivelling front and rear axles. In this way there is a uniform transmission of the rotation, without the need of using universal joints.

Figure 8:
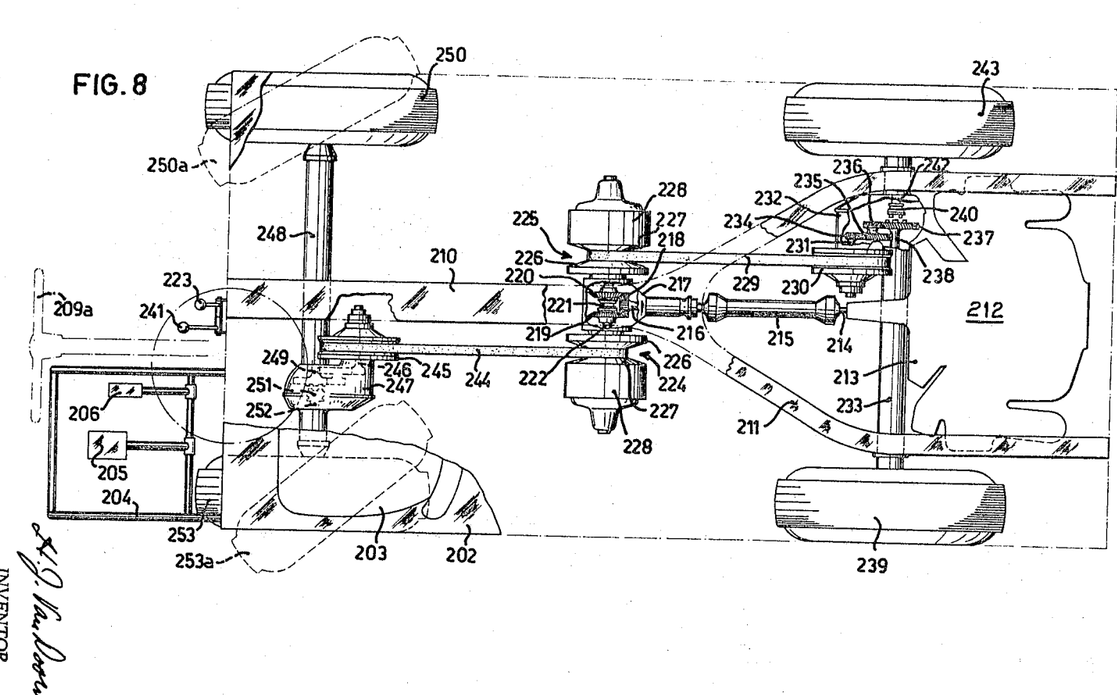
FIGURE 8 is a plan view of a third embodiment, the greater part of the floor being broken away in order to show the several parts beneath it.
Figure 9:
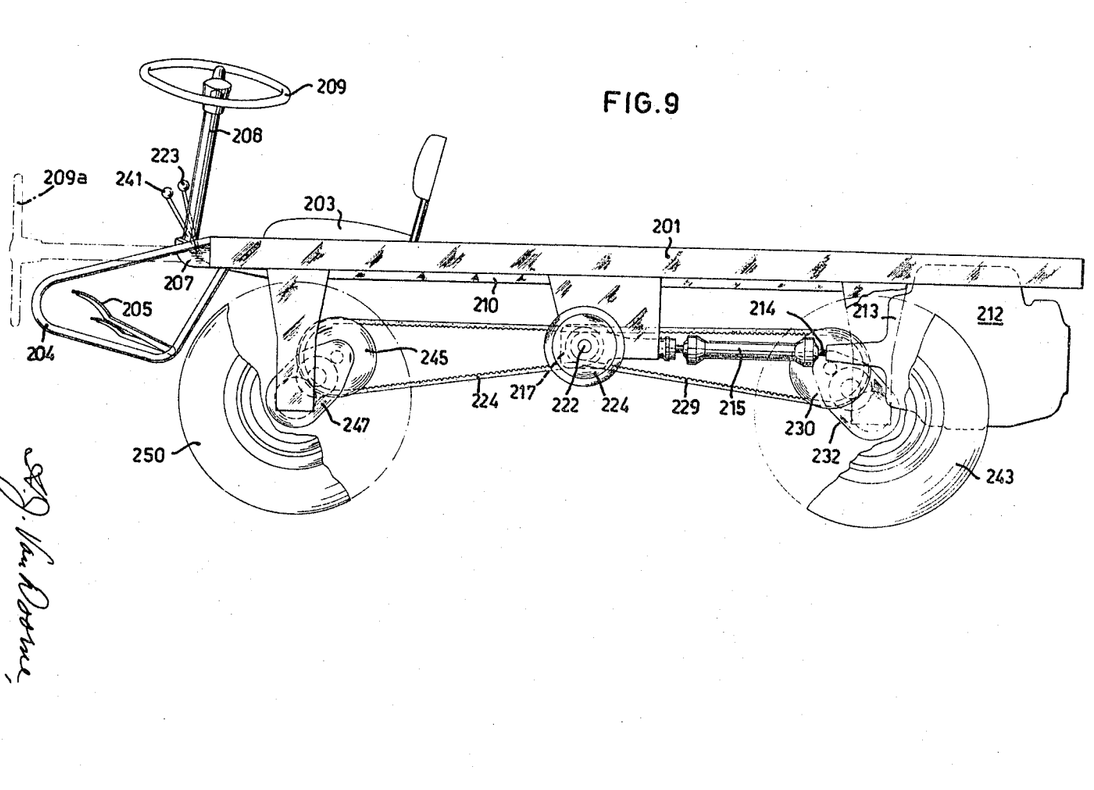
FIGURE 9 is a side view of the vehicle shown in FIGURE 8, a part of the wheels being broken away in order to show the construction behind them.

Although the third embodiment shown in FIGS. 8 and 9 is based on the same principle as the embodiments shown in FIGS. 1 to 4 and 5 to 7, the difference from the foregoing is that the engine is arranged near one end of the vehicle either at the front end or the rear end with its driving shaft in longitudinal direction.

This embodiment comprises a main frame 201 carrying a floor 202, the greater part of this floor being broken away in order to show the parts beneath it. A seat 203 for the driver is fixed on the floor 202 and an auxiliary frame 204 is secured to the front of the frame 201. The auxiliary frame carries a brake pedal 205 and an accelerator 206 and in front of the driver's seat a steering gearcasing 207 carrying a steering column 208 with a steering wheel 209 is fixed to the front of the frame.

The steering column together with the steering wheel is arranged to be swung forwardly as shown in dot and dash lines 209a. The purpose of this arrangement is to enable the driver to steer the vehicle when moving backwardly. The driver walks near the front end of the reversing vehicle and in this way the pedals 205 for the brake and 206 for the gas are within the reach of his hand.

The frame comprises a longitudinal central main beam 210, the rear portion of which forms a fork 211. An engine indicated in general by 212 is carried between the legs of the fork 211 and is preferably of a boxer type. The casing of said engine forms a unit with a clutch casing 213 housing an automatic centrifugal clutch (not shown) and from there extends a driving shaft 214 substantially in the longitudinal central plane of the vehicle. The driving shaft 214 is, by means of an intermediate shaft 215 connected to the input shaft 216 in a gear casing 217. The front end of the input shaft 216 is provided with a bevel pinion 218 engaging bevel gears 219 and 220 freely rotatable on shaft 222, so that said bevel gears rotate in opposite directions. A dog clutch 221 is slidable but not rotatable on a shaft 222, so that according to the position of the dog clutch 221, the shaft 222 is driven in one direction or the other. The dog clutch 221 is controlled by a handle 223 located within the reach of the driver in order to reverse the direction of rotation of the shaft 222.

The shaft 222 carries at both sides of the casing 217 primary pulleys which are generally indicated by 224 and 225. These pulleys are of an expandable and contractable type, as shown and described in the above mentioned Patent No. 3,017,783, and each of them comprises a pulley half 226, 226 fixed on the shaft 222 and a pulley half 227, 227 slidable on said shaft. Drums 228, 228 comprising spring means, centrifugal means and vacuum means, are fixed to the slidable pulley halves 227, 227.

A belt 229 of a V-type connects the primary pulley 225 to a secondary pulley 230 of an axially expandable type, as shown and described in Patent No. 3,060,759, mentioned above. This secondary pulley 230 has a shaft 231 arranged in a gear casing 232 forming a unit with a rear axle housing 233. The shaft 231 carries a pinion 234 which by means of intermediate gears 235, 236 drives a gear 237 fixed on a shaft 238 extending through the rear axle housing 233 to the left rear wheel 239 in order to drive the same. The gear casing 232 comprises further a dog clutch 240 which may be operated by means of a handle 241 near the driver's seat. When this dog clutch is engaged, the drive is transmitted to a shaft 242 in order to drive the right rear wheel 243.

The primary pulley 224 is connected by a V-type belt 244 to a secondary pulley 245 which, like the pulley 230, is of an axially expandable type. The secondary pulley 245 has a shaft 246 rotatable in a gear casing 247 forming a unit with a front axle housing 248. The gear casing 247 comprises in the same way as the gear casing 232 a pinion, intermediate gears and a driving gear indicated by dotted lines. The driving gear is carried by a shaft 249 in order to drive the right hand front wheel 250. The gear casing 247 comprises further a dog clutch 251 which may be operated by the handle 241 near the driver's seat. When the dog clutch 251 is engaged, the drive is transmitted to a shaft 252 in order to drive the left front wheel 253.

The vehicle shown in FIGS. 8 and 9 has, as will be clear from the use of automatically variable transmissions to the front wheels 250 and 253 and to the rear wheels 239 and 243, the advantage of being extremely easy to be driven since there is no gear changing, as the drive is controlled exclusively by means of the accelerator 206. The front wheels and the rear wheels are driven by the engine 212 through the shafts 214, 215 and 216, the lateral shaft 222, the pulleys 224 and 225, the belts 229 and 244 and the pulleys 230 and 245. The drive to all wheels adapts itself to the resistance met by the vehicle in a way as described in the above-mentioned Patent No. 3,017,785. Any difference of the rotational speeds of the front wheels and the rear wheels is taken by the automatic adjustment of the expandable pulleys.

According to FIG. 8 the front wheels are steerable. When driving a left bend the front wheels 250 and 253 take the positions indicated by the dotted lines 250a and 253a, respectively. It will be evident that the embodiment shown in FIGS. 8 and 9 can also be executed with four steerable wheels like the embodiment shown in FIGS. 5 to 7.

The dog clutches 240 and 251 make it possible, if required, either to drive two diagonally opposed wheels, such as the left rear wheel 239 and the right front wheel 250, or all wheels 239, 243, 250, 253 at the same time.

In a more simple construction the dog clutches 240 and 251 may be omitted and in this case left and right rear wheels as well as the left and right front wheels may be connected together by rigid means, respectively. This may be allowable for a vehicle that is driven almost exclusively on uneven ground. It will be clear that the shafts of the front wheel drive and the rear wheel drive may also comprise differential gears, if desired of the self-locking type.

The embodiment shown in FIGS. 8 and 9 may be sprung only by the flexibility of large tires, or it may be provided with cross springs or other spring means. If the front wheels and the rear wheels, and consequently the front axle and the rear axle, go up and down, the stretching effect on the belts is so small that it will easily be taken by the expandable pulleys.

With reference to the three embodiments it is remarked that rubber or other cushions may be arranged wherever it will be desirable in order to obtain freedom of movement for the front axle and/or the rear axle as well for the up and down movements as for sideway swivelling.

I claim:
1. A four wheel drive for a vehicle comprising a power plant, control means for driving said vehicle comprising an accelerator and a brake pedal, a drive shaft driven by said power plant, an automatic centrifugal clutch connecting said power plant to said drive shaft, a primary axially expandable and contractible pulley having a fixed pulley half and a slidable pulley half driven by said drive shaft, means to adapt the mutual distance between said pulley halves to the engine speed and the driving resistance, a secondary axially expandable and contractible pulley, a flexible drive between said primary pulley and said secondary pulley, a shaft driven by said secondary pulley, a rear axle upon which the rear wheels of said vehicle are mounted, reduction means interconnecting said shaft from said secondary pulley to said rear axle, a front axle having the front wheels of said vehicle mounted thereon, a telescoping shaft connecting said reduction means to said front axle, whereby said vehicle may be driven and controlled under all conditions by said accelerator and brake pedal and connecting means upon said control means extending to the rear of the vehicle so that said vehicle may be controlled from the rear.

2. A four wheel drive for a vehicle comprising a power plant, control means for driving said vehicle comprising an accelerator and a brake pedal, a drive shaft driven by said power plant, an automatic centrifugal clutch connecting said power plant to said drive shaft, a primary axially expandable and contractible pulley having a fixed pulley half and a slidable pulley half driven by said drive shaft, means to adapt the mutual distance between said pulley halves to the engine speed and the driving resistance, a secondary axially expandable and contractible pulley, a flexible drive between said primary pulley and said secondary pulley, a shaft driven by said secondary pulley, a rear axle upon which the rear wheels of said vehicle are said secondary pulley to said rear axle, a front axle having the front wheels of said vehicle mounted thereon, a telescoping shaft connecting said reduction means to said front axle, whereby said vehicle may be driven and controlled under all conditions by said accelerator and brake pedal and a drum comprising brake means associated with said telescoping shaft.

References Cited
UNITED STATES PATENTS

| | | | |
|---|---|---|---|
| 830,642 | 9/1906 | Chaquette | 180—44 |
| 2,150,456 | 3/1939 | Perrine. | |
| 2,420,100 | 5/1947 | Salsbury | 180—70 |
| 2,521,457 | 9/1950 | Heyer | 74—230.17 |
| 3,017,783 | 1/1962 | Van der Brugghen et al. | 74—230.17 |
| 3,108,481 | 10/1963 | Westmont | 180—70 X |
| 3,200,666 | 8/1965 | Schrodt et al. | 74—230.17 X |

A. HARRY LEVY, *Primary Examiner.*